United States Patent [19]

Gasser

[11] Patent Number: 4,996,647
[45] Date of Patent: Feb. 26, 1991

[54] DIGITAL STATISTICAL PROCESSING FOR SIGNAL PARAMETER DETERMINATION

[75] Inventor: Ernest S. Gasser, Earlysville, Va.

[73] Assignee: Sperry Marine Inc., Charlottesville, Va.

[21] Appl. No.: 328,843

[22] Filed: Mar. 27, 1989

[51] Int. Cl.⁵ .............................................. G06F 15/20
[52] U.S. Cl. .................................... 364/484; 328/165; 364/554; 364/572
[58] Field of Search ............... 364/484, 486, 487, 572, 364/574, 554; 340/146.2; 455/296, 303; 328/163, 165; 342/91

[56] References Cited

U.S. PATENT DOCUMENTS

| | | | |
|---|---|---|---|
| 4,084,245 | 4/1978 | Bunge | 364/554 |
| 4,115,867 | 9/1978 | Vladimirov et al. | 364/554 |
| 4,462,081 | 7/1984 | Lehan | 364/554 |
| 4,635,217 | 1/1987 | O'Connor et al. | 364/572 |
| 4,665,390 | 5/1987 | Kern et al. | 364/554 |
| 4,751,623 | 6/1988 | Agarwal et al. | 364/554 |
| 4,782,456 | 11/1988 | Poussier et al. | 364/554 |
| 4,855,897 | 8/1989 | Shinskey | 364/554 |

*Primary Examiner*—Kevin J. Teska
*Attorney, Agent, or Firm*—Seymour Levine

[57] ABSTRACT

A system for identifying a received signal includes a comparator wherein random variables defining the signal are compared to upper and lower thresholds established in accordance with a statistical cube defined by the statistics determined for each random variable by processing a multiplicity of the received signals.

8 Claims, 2 Drawing Sheets

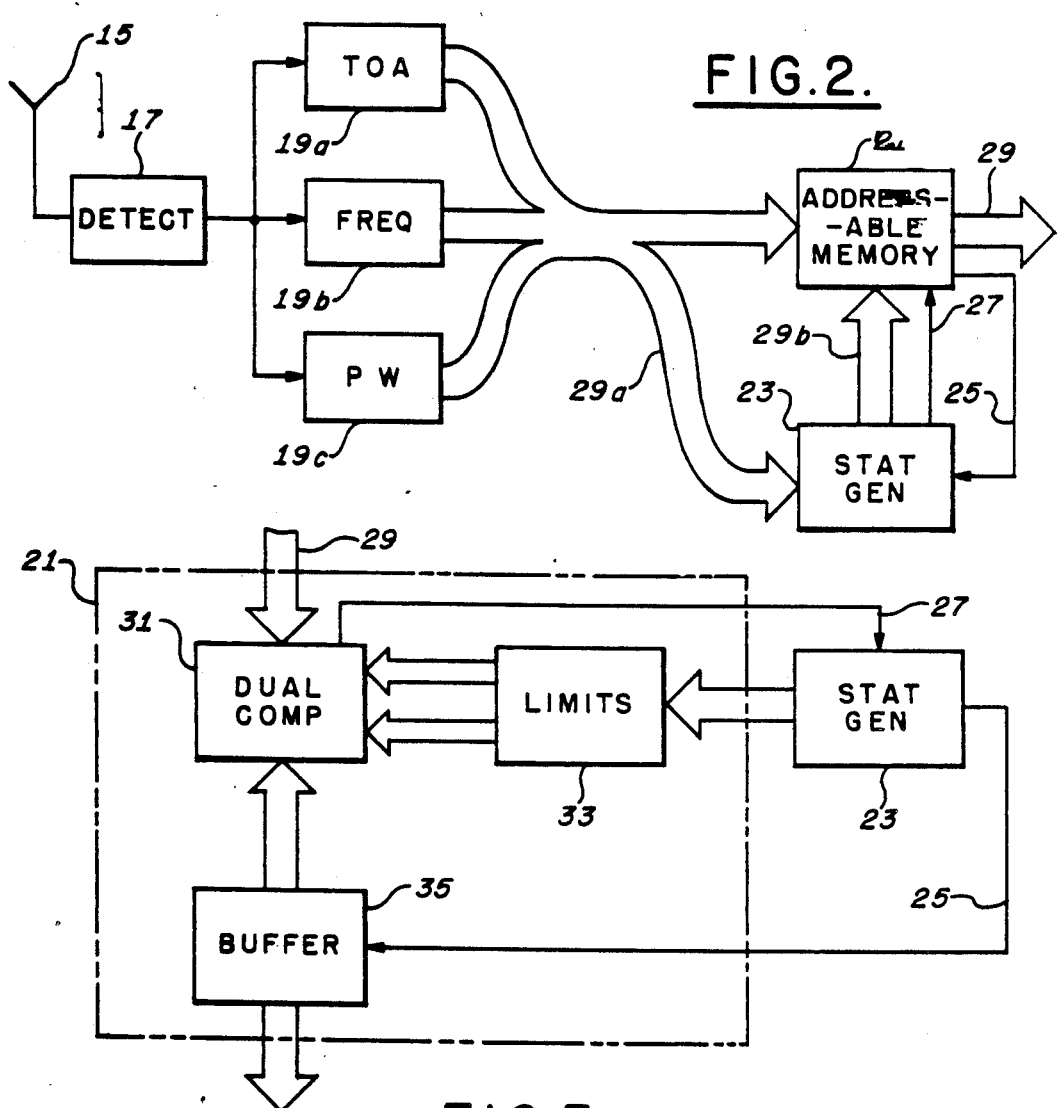
FIG.2.
FIG.3.
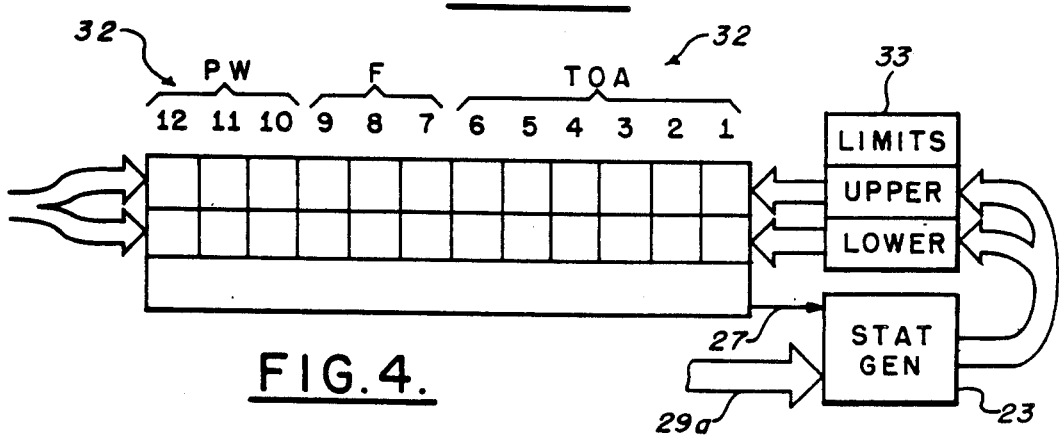
FIG.4.

DIGITAL STATISTICAL PROCESSING FOR SIGNAL PARAMETER DETERMINATION

BACKGROUND OF THE INVENTION

1. Field of the Invention

The invention pertains to the field of Digital Statistical Signal Processing (DSSP) and more particularly to the processing of statistically determinable received signals for the determination of signal parameters.

2. Background of the Invention

Improvements in radar technology has encouraged the development and usage of a multiplicity of radar systems, some of which are highly complex. The large number of radar systems in use presents a high density signal environment from which the extraction of signal parameters of radiating systems is a difficult task. Prior art systems for extracting radiated signal parameters use conventional combinations of hardware and software that are severely limited in an emission dense environment. These limitations are such that the statistical analysis of received emissions to determine signal parameters is generally performed off line. The general purpose of these signal evaluating systems is to identify signal emissions with particular radiating systems. Identification accuracy of radiating systems increases with the number of discriminators, i.e. frequency, pulse width, time of arrival, etc., that are employed. This problem is complicated further by the concurrent processing of the received signals for a rapid evaluation of the radiating environment.

Signal emissions are random variables (RV) and may therefore be described and processed statistically. Signal emissions are generally described by three RVs, Pulse Rate Interval, Pulse Width, and Frequency, generally denoted TOA, PW, and F, respectively. Statistical analysis is instructively intensive and therefore not conducive to real time processing for utilizing the distributed processing techniques of the prior art system architectures.

SUMMARY OF THE INVENTION

A digital signal processor in accordance with the present invention provides digital signal representations of the time of arrival, frequency, and pulse width of each signal received from a radiating environment. These signals are coupled to a comparator wherein a comparison is performed to determine whether the signals lie between an upper and lower bound. Each of the upper and lower bounds are initially predetermined. When a signal has all its parameters within a preset bound, the parameters are coupled to a statistical generator which determines the mean value and variance for each parameter and adjusts the upper and lower bound in accordance therewith. Subsequent receptions of the signal are then compared to the adjusted upper and lower bounds and when a signal is within its respective bounds it is coupled to the statistical generator and the statistics are recalculated in view of this new data. Changes in the mean value and variance of a parameter occasioned by this new data are utilized to adjust the upper and lower bounds for comparison with the next subsequent signal reception. This procedure continues until the statistical generator has determined that sufficient data for valid statistics have been received, whereafter the measured signal parameters of an emitter is provided for further processing.

In a second embodiment of the invention, a time multiplexer is positioned to receive the emitter signal parameters prior to coupling to the comparator and statistical generator. This multiplexer sequentially positions the signal parameters of a plurality of signal emitters, couples this train of signal parameters to the comparator, and commands the statistical generator to couple the appropriate upper and lower bounds to the comparator for the proper comparison in the time multiplex chain. The number of received pulse signals that may be processed in this manner is a function of the pulse repetition intervals of the emitted signals and the processing speed of the comparators.

Further details and advantages of the present invention will be more fully provided in the description of the preferred embodiments of the invention as illustrated in the accompanying drawings.

BRIEF DESCRIPTION OF THE DRAWINGS

FIG. 2 is a block diagram of a preferred embodiment of the invention.

FIG. 3 is a block diagram of an addressable memory usable with the preferred embodiment.

FIG. 4 is a representation of a dual comparator which may be utilized in the addressable memory.

DESCRIPTION OF THE PREFERRED EMBODIMENTS

Figure 1:
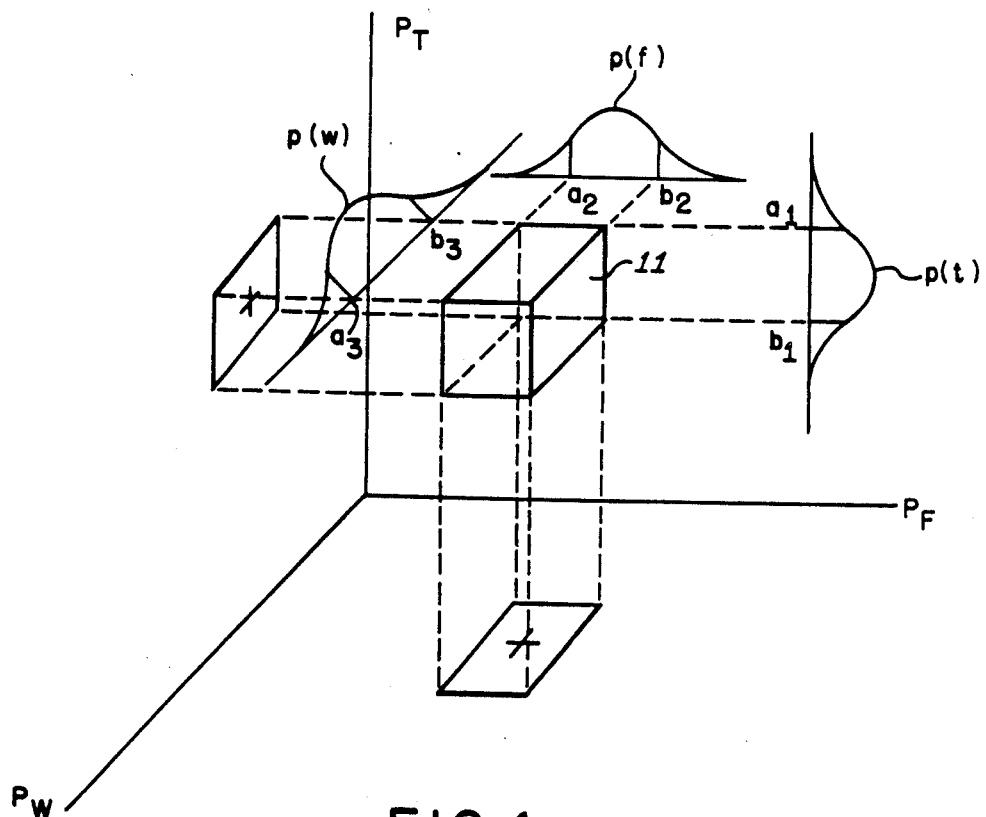
FIG. 1 is a representation of a statistical cube formed from the probability density functions of three independent random variables.

Signal transmission may be characterized by three independent random variables, the interpulse period or repetition rate interval (T), carrier frequency (F), and pulse width (W). The probability that a signal possessing the three identifiable independent random variables is the product of the probabilities that each is within specified bounding limits and is given by $$P[(FTW) \epsilon V] = \int_{a_1}^{b_1} p(t)dt \int_{a_2}^{b_2} p(f)df \int_{a_3}^{b_3} p(w)dw$$

where $a_i$ and $b_i$ are limits determined by the probability of occurrence that is desired. Assuming a normal or Guassian distribution $$a_i = m_i - k\sigma_i \text{ and } b_i = m_i + k\sigma_i$$

where $m_i$ is the mean value of the random variable, $\sigma_i$ is the variance of the distribution and k is a weighting factor chosen to provide a desired probability, e.g. $k=1$ for a normal distribution provides a probability of 0.68 that the random variable will be within the specified bounds, while $k=2$ provides a probability of 0.95 that the random variable will be within the specified bounds.

Refer now to FIG. 2 wherein a block diagram of a digital statistical signal processor (DSSP) is shown. Signals radiating in the environment are received through an antenna 15 detected in a detection circuit 17 and coupled therefrom to circuits 19a through 19c wherefrom digital signals representative of the time of arrival, frequency, and pulse width of the received signals, respectively, are provided in manners well known in the art. These digital signals are coupled to an addressable memory 21 wherein a comparison of the digital representative signals and threshold digital signals representative of the bounds of the statistical cube 11 is performed. If the three digital signals representative of time of arrival, frequency and pulse width are all greater than or equal to the lower bound representative signal and less than or equal to the upper bound representative signal, a signal is provided from the addressable memory 21 to a statistical generator 23 via line 25 to enable the statistical generator to receive the three digital random variable signals for utilization in the determination of the statistical parameters for the received signal. The upper and lower bound representative digital signals are initially preset at predetermined values to provide a statistical cube of relatively broad dimensions so that a sufficient number of signals may be processed to establish a valid probability density function for that signal. After a predetermined number of signals for valid statistical parameter calculations have been received and entered into the statistical generator, as described above, the upper bound representative signal is adjusted for $m_i + k\sigma_i$ and the lower bound representative signal is adjusted for $m_i - k\sigma_i$. These modified limits are then loaded into the Addressable Memory (21) via lines 29b. The statistical generator then enables the addressable memory via line 27 to provide all subsequent signals within the newly established statistical cube via output line 29 as the parameters of a signal received from the radiation environment.

A block diagram of a circuit which may be employed as the addressable memory 21 is shown in FIG. 3. Digital signals representative of the time of arrival, frequency, and pulse width of a received signal are coupled via the bus 29 to a dual comparator 31, yet to be described. Dual comparator 31 compares signals entered therein via bus 29 to upper and lower bound limit representative signals (threshold signals) coupled thereto from a limit signal generator 33 which is responsive to the statistical parameters provided by the statistical generator 23. When the dual comparator 31 determines that all three random variables are within the set limits, the random variable values are coupled to a memory location (window) in a buffer 35. After the predetermined number of random variable samples have been provided to the statistical generator channel that processes a given emission in the statistical generator 23, a select window signal is provided via line 25 to the buffer 35, thereby releasing the signal parameters for the given signal stored in that window.

A dual comparator suitable for a use in the addressing memory 21 is illustrated in FIG. 4. This comparator may contain dual registers, each having 12 fields of four bits for a total of 48 bits which may be divided between the three random variables, as for example, three fields each for the pulse width and frequency and six fields for the time of arrival, as illustrated in the figure. The upper and lower thresholds corresponding to the statistical parameters provided by the statistical generator 23 are determined in a limits generator 33 and coupled therefrom to the upper and lower registers. After the signal random variables have been introduced into the upper and lower registers the comparisons in all fields are made in parallel and the processing continues as described above. Those skilled in the art should recognize that the dual comparator may comprise a multiplicity of the dual registers 32, each providing a window for one received signal. Such a dual comparator would act as its own buffer and directly provide a signal parameter output in response to a signal from the statistical generator indicating that a sufficient number of samples have been received for a valid determination.

Figure 5:
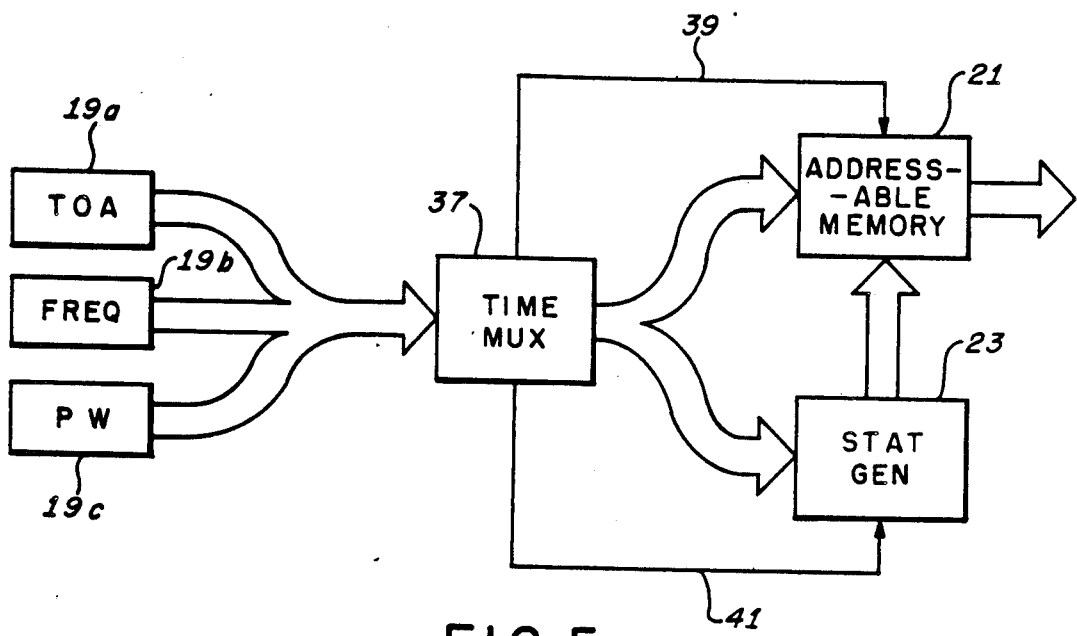
FIG. 5 is a block diagram of a second preferred embodiment of the invention wherein time multiplexing is utilized.

Many signals in a radiation environment have short duty cycles, i.e. the ratio of the illumination time to the scan rate interval is small. These signals have long periods of inactivity which may be utilized for processing other pulsed signals, if proper bookkeeping is maintained by the system. To accomplish this, representative digital signals from the time of arrival detector 19a, the frequency discriminator 19b, and the pulse width determinator 19c, shown in FIG. 5, are coupled to a time multiplexing unit 37 wherein a serial sequence of a multiplicity of digital words is established and coupled to the addressable memory 21 and the statistical generator 23. A signal from the time multiplexer 37 coupled to the addressable memory via line 39 selects a window in the addressable memory wherein several digital words representative of the time arrival, frequency and pulse width of several received signals are sequentially entered. Each window is filled sequentially with the random variables of several received signals. Concurrent with these entries the time multiplexer 37 sends statistical channel selection signals via a line 41 to synchronize the statistical generator 23 channel selection with the three random variable word entries for each received signal. In this manner maximum utilization of the processing circuitry is achieved.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. An apparatus for determining parameters of a received signal, the parameters including time of arrival, pulse width, and frequency comprising:

means for providing parameter representative signals for said received signal;

comparing means coupled to receive said parameter representative signals of said received signal for comparing said parameter representative signals to respective upper threshold signals and respective lower threshold signals and for providing said parameter representative signals of said received signal when all said parameter representative signals of said received signal are less than said respective upper threshold signals and greater than said respective lower threshold signals; and processing means enabled by said comparing means to receive said parameter representative signals of said received signal when all said parameter representative signals of said received signals are bounded by said respective upper and lower threshold signals for processing said parameter representative signals of said received signal with previously received parameter representative signals of said received signal to establish statistical parameters and for adjusting said upper and lower threshold signals in accordance with said statistical parameters.

2. An apparatus in accordance with claim 1 wherein said comparing means comprises:

a dual comparator having a first channel for comparing parameter representative signals of the received signal to said respective upper threshold signals and a second channel for comparing said parameter representative signals of said received signal to said lower threshold signals;

means coupled to said processing means for entering upper and lower threshold signals in said first and second channels, respectively, for comparison with parameter representative signals of said received signal;

buffer means for storing parameter representative signals of said received signal in respective to storage locations when all said parameter representative signals of said received signal are less than said respective upper threshold signal and greater than lower threshold signal and for providing parameter representative signals of said received signal stored in its respective location in response to a signal representative processing means indicating that a sufficient number of samples of said received signal has been processed.

3. An apparatus in accordance with claim 1, further including means coupled to said parameter means, said comparing means, and said processing means for time multiplexing parameter representative signals of a plurality of received signals to establish a time sequence so that parameter representative signals are sequentially compared to sequentially provided threshold signals, established by said processing means, that correspond respectively to said time sequence of parameter representative signals.

4. An apparatus in accordance with claim 1 wherein said comparing means includes a plurality of processing units, each having locations for storing said upper threshold signal and said lower threshold signal and whereat parameter representative signals of a received signal associated with that location are compared to said upper and lower threshold signals.

5. An apparatus in accordance with claim 4 further including time multiplexing means coupled between said parameter representative signals means and said processing units for time multiplexing a multiplicity of signals to each of said processing units.

6. An apparatus in accordance with claim 1 wherein said statistical parameters established by said processing means are mean value (m) and standard deviation ($\sigma$) of said parameters of said received signals.

7. An apparatus in accordance with claim 6 wherein said upper threshold is adjusted in accordance with $m+k\sigma$ and said lower threshold adjusted in accordance with $m-k\sigma$, where k is a factor chosen to provide a preselected probability.

8. A method of determining parameters of a received signal comprising the steps of:

providing parameter representative signals for said received signal;

comparing said parameter representative signals to predetermined threshold signals to establish that said parameter representative signals are within a predetermined statistical range represented by said threshold signals;

processing said parameter representative signals of said received signal, when within said predetermined statistical range, with parameter representative signals associated with said predetermined statistical range to obtain adjusted threshold signals representative of statistics obtained from said processing;

using said adjusted threshold signals for subsequent comparisons;

repeating said providing, comparing and processing steps until a sufficient number of repetitions of said received signal have been processed to establish valid statistics; and providing said parameter representative signals that are within a statistical range associated with threshold signals resulting after said valid statistics have been achieved, thereby determining said parameters of said received signal.

* * * * *